106-74. AU 116 EX
5-21-74 XR 3,811,853

United States Patent [19]
Bartholomew et al.

[11] 3,811,853
[45] May 21, 1974

[54] DEGRADABLE GLASS SUITABLE FOR CONTAINERS

[75] Inventors: Roger F. Bartholomew, Painted Post; Donald E. Campbell, Corning; Harold F. Dates, Corning; Stanley S. Lewek, Corning; Francis J. Marusak, Corning; Joseph E. Pierson, Painted Post; Stanley D. Stookey, Corning; Bruce A. Swinehart, Big Flats, all of N.Y.

[73] Assignee: Corning Glass Works, Corning, N.Y.

[22] Filed: May 1, 1972

[21] Appl. No.: 249,289

[52] U.S. Cl............... 65/23, 65/30, 106/52, 106/74, 106/53, 106/54, 106/39, 161/410, 215/1 C, 117/124 A, 117/54, 156/155
[51] Int. Cl... C03c 19/00, C03b 33/00, B65d 23/00
[58] Field of Search........ 65/23, 30; 117/124 A, 54; 156/155; 161/410; 215/1 C; 106/52, 74, 54, 53

[56] References Cited
UNITED STATES PATENTS
3,485,647 12/1969 Harrington.................. 65/30 X
3,726,657 4/1973 VerDow................... 65/23

OTHER PUBLICATIONS

Solid Waste Treatment, Aiche Symposium Series, pages 6 to 12, No. 122, Vol. 68–1972.

Improving Package Disposability, Conf. on Packaging Waste, pages abstract 14, San Francisco, Calif., 1969.

Ceramic Society Bulletin, April 1972, pages 374–375, Vol. 51, No. 4, (1972).

Design and Evaluation, Water Disposable Glass Packing Container, Final Report, pages 21–27.

*Primary Examiner*—Frank W. Miga
*Attorney, Agent, or Firm*—Clinton S. Janes, Jr.

[57] ABSTRACT

The present invention relates to the production of glasses included within particularly-defined ranges of the sodium silicate and/or potassium silicate composition system which will spontaneously degrade or disintegrate in the ambient atmosphere into relatively non-polluting residual material.

56 Claims, 1 Drawing Figure

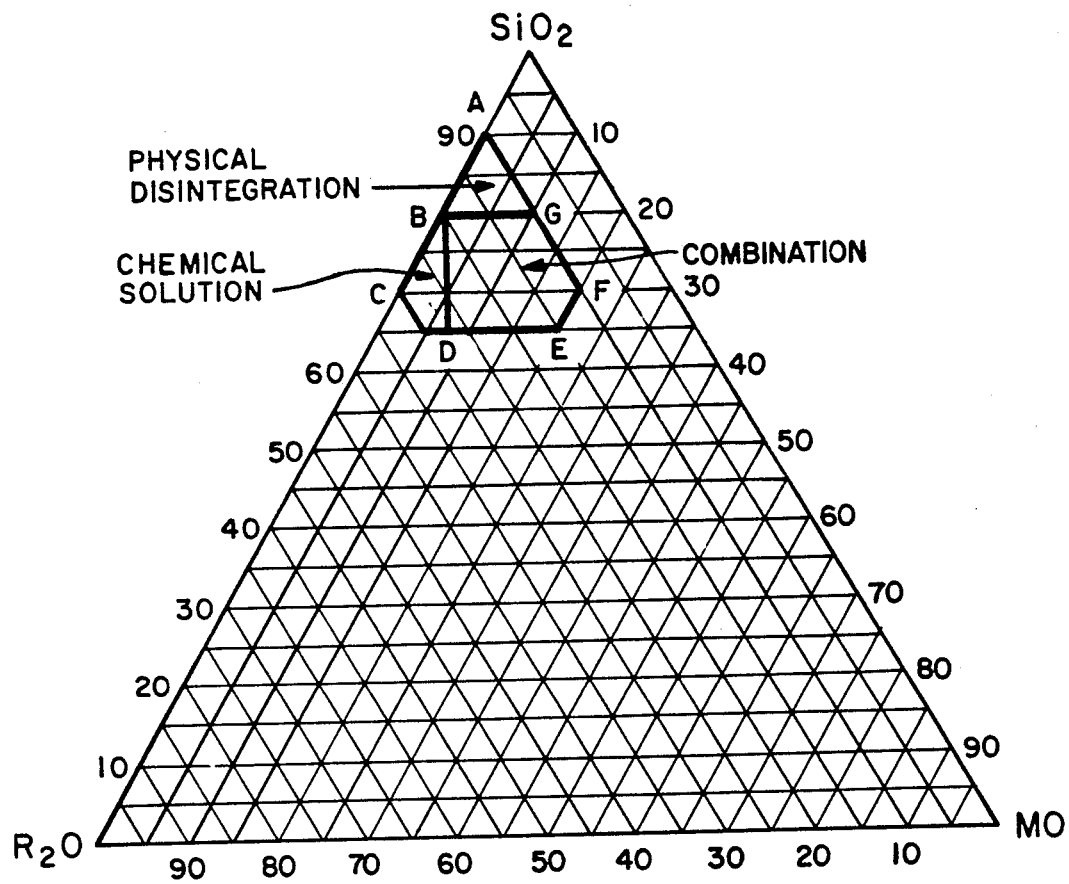

DEGRADABLE GLASS SUITABLE FOR CONTAINERS

The hazards to health and the blight to aesthetics resulting from pollution of all kinds have long been recognized, but it has only been in the last few years that concentrated large scale efforts have been undertaken to improve the situation. Thus, local, state and federal government regulations have been promulgated to force the reduction of air pollution and curtail indiscriminate disposal of solid wastes. In the field of solid waste disposal, effective and economically feasible methods for re-using the solid material or, in some manner, altering the character thereof so it can be assimilated into the earth's soil within a reasonably short length of time have been sought. With respect to this latter alternative, the rusting of iron is a well-known phenomenon but that reaction will take months or even years to accomplish, depending upon the climate and atmosphere at the disposal site.

Furthermore, certain materials such as aluminum, plastics, and glass are essentially inert to the effects of weathering so that, in essence, they do not degrade in the normal environment. Hence, the conventional glass compositions employed in the making of bottles, jars, flasks, etc., are, by their very need, extremely resistant to usual atmospheric conditions such that the spontaneous degradation thereof under ordinary conditions is virtually unknown. It has been estimated that glass containers constitute less than 10 percent and probably no more than 5 percent of the solid waste problem. Unfortunately, however, this relatively small actual contribution to the solid wastes is disproportionately visible and, therefore, is surely a pollutant if only principally to aesthetics. Thus, whereas the conventional container glass does not degrade except extremely slowly under normal atmospheric conditions such that glass does not pollute the earth's soil and water in the usual sense of pollution, its presence constitutes an unpleasantness to the eye. There is no question that these glass containers could be returned to the glass manufacturer and remelted to produce new articles. Nevertheless, efforts to date to encourage this re-cycling of glass have met with little success.

Therefore, what has been needed, and the primary objective of this invention is to fulfill that need, is a glass container which, up to the time it is discarded, would be amply chemically resistant to atmospheric weathering and the material contained within, but which, when or after the contained material is removed therefrom, would self-degrade into a relatively harmless residue.

We have discovered that such containers can be made through the hydration of glasses having compositions within carefully-defined ranges of the $Na_2O$ and/or $K_2O$-$SiO_2$ field with, preferably, various optional additional ingredients.

U.S. Pat. No. 3,498,803 discloses the steam treatment of certain glass and glass-ceramic articles such as to produce at least a surface portion thereof which is nonporous and exhibits rubber-like characteristics. That patent describes exposing alkali-metal silicate glass articles (60–94 mole percent $SiO_2$ and 6–40 mole percent $Na_2O$ and/or $K_2O$) to atmospheres of water vapor or steam at 80°–200°C. for a sufficient length of time to effect a reaction between the gaseous water and the alkali metal silicate. The rate thereof is dependent upon time and temperature. Analysis of the rubber-like portions of those products demonstrated a water content therein of about 5–30 weight percent with a concomitant proportionate reduction of about 5–30 weight percent in the amounts of the original constituents present in the base glass.

That patent also disclosed that when the stated steam treatment of the glass was carried out for only such period of time as to develop a non-porous, rubbery surface layer, the resulting article would exhibit a very high mechanical strength. Thus, when a rubbery surface layer having a depth of at least 0.1 mm. and, preferably, at least 1 mm. was formed in the article, modulus of rupture values ranging between about 80,000–250,000 psi were measured on ¼ inch diameter glass cane samples.

However, whereas the glasses steam treated in accordance with U.S. Pat. No. 3,498,803 did, indeed, manifest excellent mechanical strengths as made, the products of the steam treatment demonstrated relatively poor chemical durability and resistance to weathering. Hence, exposure of the glasses to the ambient atmosphere for short periods of time frequently resulted in such surface attack, with concurrent reduction in mechanical strength, as to render the products of little practical use. Soaking in boiling water customarily resulted in disruption of the surface and leaching.

Inasmuch as sand is normally the primary ingredient of most glass compositions, an ideal degradation of glass containers has been considered as "returning to nature as a pile of sand." That goal can be achieved in the instant invention. Hence, we have discovered that certain glasses within the $Na_2O$ and/or $K_2O$-$SiO_2$ composition system, and, optionally, containing one or more of the following compatible metal oxides, e.g., $MgO$, $B_2O_3$, $ZrO_2$, $ZnO$, $Al_2O_3$, $SrO$, $PbO$, $TiO_2$, $BaO$, $Fe_2O_3$, $NiO$, $MnO$, $CaO$, $CoO$, and $FeO$, will exhibit good chemical durability as formed or, where necessary, treated as hereinafter described to secure such durability, and which, after being hydrated in a water-containing environment at an elevated temperature, will demonstrate limited resistance to weathering and may be leachable in water. Extended exposure to weathering and dehydration will result in the degradation of these glasses through physical disintegration and/or chemical solution to a finely-divided residue imitative of a "pile of sand."

In the physical disintegration mode of degradation, dehydration leads to shrinkage and cracking in the body, these factors resulting in the breakdown of the body into innumerable fine particles. Chemical solution contemplates the breakdown of the body through the weathering or other chemical attack of the body. It can be appreciated that these two mechanisms of degradation may occur concurrently. From an ecological point of view, disintegration through physical means alone is to be preferred since there would be no solution of the glass components with the consequent uptake thereof in the earth's soil. However, from a manufacturing point of view, those glasses subject to chemical solution are more advantageous since melting and subsequent processing can generally be undertaken at lower temperatures.

Therefore, describing our invention in its most comprehensive terms, we have learned that such glasses can be secured from compositions consisting essentially, by weight on the oxide basis, of about 10–30% $Na_2O$ and- /or $K_2O$, 65–90% $SiO_2$, and 0–20 percent of one or more of the compatible metal oxides CaO, ZnO, MgO, $B_2O_3$, $ZrO_2$, $Al_2O_3$, SrO, PbO, BaO, $Fe_2O_3$, NiO, $TiO_2$, MnO, CuO, CoO, and FeO. The latter six metal oxides are particularly useful as colorants or opacifiers whereas the other additions except for CaO normally leave the glass colorless and transparent. CaO tends to cause the glass to opacify during the hydration step. For a ready understanding of the degradation mechanisms obtaining over the operable composition field of the invention, reference is made to the appended ternary diagram wherein the three components comprise $SiO_2$, $Na_2O$ and/or $K_2O$ ($R_2O$), and the compatible metal oxides (MO) as a class. It will be observed that points ABCDEFGA enclose the total area of compositions which are operable in the invention with three subdivisions of this area delineating those compositions where degradation occurs through chemical solution only, those compositions where degradation occurs through physical disintegration only, and, finally, those compositions where degradation occurs through a combination of those two mechanisms. In general, it can be said that in those glasses where the $SiO_2$ content is less than about 80 percent by weight, at least about 2 percent by weight of the compatible metal oxides has been found necessary to insure good chemical durability in the glass as originally made. However, when the $SiO_2$ content of the glass is greater than about 80 percent by weight, the presence of the modifying compatible metal oxides has not been demonstrated as being necessary to impart good chemical durability. Nevertheless, glasses containing high $SiO_2$ contents demand higher melting temperatures and exhibit higher liquidus values so the more practical glasses will contain a third component to reduce the melting temperature required and, if necessary, improve the chemical durability of the glass. Line BD of the drawing is a somewhat arbitrary division reflecting the response of numerous samples in the two composition areas.

The operable parameters of the hydration step, while broadly similar, also vary with $SiO_2$ content. Hence, in general, the glass article is placed within a chamber into which a fluid can be introduced in a volume sufficient to create and maintain an environment of at least 50 percent by weight and, preferably, essentially 100% $H_2O$. Commonly, this environment will consist of at least 80 percent by weight steam or water vapor since contact with hot liquid water will frequently result in some surface attack. However, as will be explained in detail hereinafter, water solutions of certain acids and/or salts can be advantageously employed. This latter practice can permit the altering of the basic composition of the glass through reactions with the contacting liquids. Where steam or water vapor is utilized, air will normally constitute the remainder of the atmosphere present although various inert gases such as argon, helium, hydrogen, or nitrogen can be successfully employed. Also, such acidic gases as $CO_2$, acetic acid, $SO_2$, $SO_3$, or HCl can also be present to dealkalize the glass surface to improve the chemical durability and/or to develop a surface compression layer on the glass. Dry steam, i.e., steam at a temperature above its saturation temperature such that there are no entrained water droplets, is to be preferred, especially where high temperature treatments are employed, because of the tendency for the hydrated layer to dissolve, but wet steam can also prove operable.

An autoclave is advantageously utilized when temperatures above 100°C. and steam pressures greater than one atmosphere are employed to promote the rapid hydration of the glass surface. However, steam at one atmosphere pressure has proven to be suitable at the lower $SiO_2$ concentrations. This capability of employing steam at atmospheric pressure is obviously advantageous from the commercial point of view since heavywalled vessels and apparatus for inducing and controlling pressure are not required. This factor, in turn, makes the continuous hydration of the glasses reasonably uncomplicated inasmuch as some sort of a tunnel or shuttle kiln can be designed with entry ports to permit the introduction of steam therein.

Finally, hydration can also be undertaken in partial vacuums but such practice requires special equipment. Therefore, the hydration rates resulting are generally lower and no substantive improvement in the final product achieved. Therefore, our preferred practice contemplates hydration at atmospheric pressure or greater.

The glass articles are heated in the water vapor or steam atmosphere at elevated temperatures, i.e., normally greater than 80°C. for a period of time sufficient to hydrate at least a surface layer thereof. Thereafter, the heat to the reaction chamber is stopped, the flow of steam halted, and the article withdrawn from the chamber. It will be readily appreciated that, inasmuch as the hydration of the glass article proceeds from the surface inwardly, the treatment time required for any particular product will be dependent upon the thickness of the hydrated layer desired, the steam pressure utilized, the composition of the glass, and the treatment temperature employed. At temperatures below about 80°C., hydration becomes very slow due in part to the lower vapor pressure of water. Therefore, 80°C. has been deemed a practical minimum operating temperature with steam. Although the rate of hydration is increased as the temperature of the reaction is raised, the quality of the product secured at temperatures higher than about 300°C. has not been found to be substantially superior to that obtained at lower temperatures. In view of this factor, 300°C. has been considered a practical maximum operating temperature.

We have determined that whereas those binary alkali silicate glasses containing less than about 80 percent by weight $SiO_2$ with, optionally, other metal oxides can be hydrated with reasonable ease at temperatures within the cooler extreme of the above range, e.g., between 50°–120°C., and employing water solutions or steam at atmospheric pressure or lower, glasses containing higher $SiO_2$ and optional metal oxide contents demand temperatures in excess of about 120°C. and steam at greater gauge pressures, i.e., at least 15 psig.

In general, we have learned that the best glassworking properties, hydration action, and chemical durability over the broadest range of compositions are attained where the modifying compatible metal oxide is MgO and/or $Al_2O_3$ and/or $B_2O_3$. Thus, our preferred glass compositions have contemplated the ternary system $SiO_2$, $R_2O$, and MgO and/or $Al_2O_3$ and/or $B_2O_3$ with the third component varying up to 20 percent of either alone or some combination of the three options. Normally, the colorant oxides will not be utilized in amounts greater than about 5 percent in toto. The modifying oxides other than MgO, $Al_2O_3$ and $B_2O_3$ can lead to melting and forming problems, poor hydration action, etc., when present in amounts greater than about 10 percent by weight. Therefore, the preferred practice involves individual additions in amounts not exceeding about 5 percent by weight.

Table I records examples of glass compositions, expressed in weight percent on the oxide basis, which were treated in accordance with the process parameters of this invention. Batches therefor were compounded from materials, either oxides or other compounds, which, upon being melted together, are converted to the desired oxide compositions in the proper proportions. The batch ingredients were blended together carefully, the mixtures usually ballmilled to aid in assuring a homogeneous melt, and thereafter melted in open platinum or silica crucibles for about 16 hours at 1,450°–1,600°C. (In commercial practice, larger melts can be made in pots or continuous tanks following conventional glassmaking procedures.) The melts were subsequently cooled to working temperatures and bottles blown or ¼ inch diameter rods drawn employing an updraw-type cane drawing apparatus. These rods were cut into 4 inches lengths for further treatment.

TABLE I

|  | 1 | 2 | 3 | 4 | 5 | 6 | 7 | 8 |
|---|---|---|---|---|---|---|---|---|
| $SiO_2$ | 74.5% | 79.0% | 76.0% | 76.0% | 82.0% | 70.0% | 79.0% | 79.0% |
| $Na_2O$ | 21.4 | — | — | — | — | — | — | 19.0 |
| $K_2O$ | — | 19.0 | 24.0 | 22.0 | 18.0 | 30.0 | 16.0 | — |
| MgO | 2.0 | 2.0 | — | 2.0 | — | — | — | 2.0 |
| $B_2O_3$ | 1.6 | — | — | — | — | — | — | — |
| $Al_2O_3$ | 0.5 | — | — | — | — | — | — | — |
| BaO | — | — | — | — | — | — | 5.0 | — |

|  | 9 | 10 | 11 | 12 | 13 | 14 | 15 | 16 |
|---|---|---|---|---|---|---|---|---|
| $SiO_2$ | 74.0% | 78.0% | 82.4% | 75.0% | 78.0% | 79.0% | 77.0% | 75.0% |
| $Na_2O$ | — | — | — | — | 19.5 | — | — | 5.0 |
| $K_2O$ | 24.0 | 22.0 | 12.1 | 25.0 | — | 17.0 | 19.0 | 14.5 |
| MgO | 2.0 | — | — | — | 1.25 | — | 4.0 | 4.75 |
| BaO | — | — | 5.5 | — | — | 4.0 | — | — |
| $Al_2O_3$ | — | — | — | — | 1.25 | — | — | 0.75 |

|  | 17 | 18 | 19 | 20 | 21 | 22 | 23 | 24 |
|---|---|---|---|---|---|---|---|---|
| $SiO_2$ | 79.0% | 77.0% | 77.0% | 74.0% | 75.0% | 76.0% | 77.0% | 78.0% |
| $Na_2O$ | — | 17.0 | — | — | 5.0 | 5.0 | 5.0 | 5.0 |
| $K_2O$ | 16.0 | — | 17.0 | 26.0 | 14.25 | 13.75 | 13.25 | 12.75 |
| MgO | 5.0 | — | 3.0 | — | 5.25 | 4.75 | 4.25 | 3.75 |
| $Al_2O_3$ | — | 1.0 | — | — | 0.5 | 0.5 | 0.5 | 0.5 |
| FeO | — | 5.0 | — | — | — | — | — | — |
| CaO | — | — | 3.0 | — | — | — | — | — |

|  | 25 | 26 | 27 | 28 | 29 | 30 | 31 | 32 |
|---|---|---|---|---|---|---|---|---|
| $SiO_2$ | 79.0% | 80.0% | 81.0% | 82.0% | 83.0% | 77.0% | 77.0% | 77.0% |
| $Na_2O$ | 5.0 | 5.0 | 5.0 | 5.0 | 5.0 | 9.0 | 18.0 | 18.0 |
| $K_2O$ | 12.25 | 11.75 | 11.25 | 10.75 | 10.25 | 9.0 | — | — |
| MgO | 3.25 | 2.75 | 2.25 | 1.75 | 1.25 | 4.5 | 4.5 | 4.0 |
| $Al_2O_3$ | 0.5 | 0.5 | 0.5 | 0.5 | 0.5 | 0.5 | 0.5 | 1.0 |

|  | 33 | 34 | 35 | 36 | 37 | 38 | 39 | 40 |
|---|---|---|---|---|---|---|---|---|
| $SiO_2$ | 77.0% | 75.0% | 75.0% | 75.0% | 75.0% | 75.0% | 75.0% | 75.0% |
| $Na_2O$ | 18.0 | 20.5 | 20.0 | 19.5 | 19.0 | 18.5 | 18.0 | 17.5 |
| MgO | 3.5 | 4.0 | 4.5 | 5.0 | 5.5 | 6.0 | 6.5 | 7.0 |
| $Al_2O_3$ | 1.5 | 0.5 | 0.5 | 0.5 | 0.5 | 0.5 | 0.5 | 0.5 |

|  | 41 | 42 | 43 | 44 | 45 | 46 | 47 | 48 |
|---|---|---|---|---|---|---|---|---|
| $SiO_2$ | 75.0% | 75.0 | 70.0% | 70.0% | 70.0% | 75.0% | 75.0% | 75.0% |
| $Na_2O$ | 17.0 | 16.5 | 22.0 | 20.0 | 18.0 | 16.0 | 15.0 | 14.0 |
| MgO | 7.5 | 8.0 | 8.0 | 10.0 | 12.0 | 9.0 | 10.0 | 11.0 |
| $Al_2O_3$ | 0.5 | 0.5 | — | — | — | — | — | — |

|  | 49 | 50 | 51 | 52 | 53 | 54 | 55 | 56 |
|---|---|---|---|---|---|---|---|---|
| $SiO_2$ | 75.0% | 80.0% | 80.0% | 67.0% | 67.0% | 67.0% | 67.0% | 67.0% |
| $Na_2O$ | 13.0 | 15.0 | 13.0 | 10.0 | 12.0 | 14.0 | 16.0 | 18.0 |
| MgO | 12.0 | 5.0 | 7.0 | — | — | — | — | — |
| $Al_2O_3$ | — | — | — | 23.0 | 21.0 | 19.0 | 17.0 | 15.0 |

|  | 57 | 58 | 59 | 60 | 61 | 62 | 63 | 64 |
|---|---|---|---|---|---|---|---|---|
| $SiO_2$ | 77.0% | 77.0% | 77.0% | 77.0% | 77.0% | 78.0% | 78.0% | 76.5% |
| $Na_2O$ | 18.0 | 16.0 | 14.0 | 12.0 | 10.0 | 4.0 | 5.75 | 20.0 |
| $Al_2O_3$ | 5.0 | 7.0 | 9.0 | 11.0 | 13.0 | 4.5 | 3.75 | 0.5 |
| $K_2O$ | — | — | — | — | — | 12.5 | 10.75 | — |
| MgO | — | — | — | — | — | 1.0 | 1.75 | 3.0 |

TABLE I—Continued

| | 65 | 66 | 67 | 68 | 69 | 70 | 71 | 72 |
|---|---|---|---|---|---|---|---|---|
| $SiO_2$ | 77.3% | 77.9% | 78.4% | 78.9% | 79.5% | 80.0% | 76.5% | 76.5% |
| $Al_2O_3$ | 1.6 | 3.0 | 3.5 | 4.0 | 4.5 | 5.0 | 1.5 | 2.5 |
| $Na_2O$ | 18.0 | 16.0 | 15.0 | 14.0 | 13.0 | 12.0 | 19.0 | 18.0 |
| $K_2O$ | 0.8 | 1.5 | 1.9 | 2.2 | 2.6 | 3.0 | — | — |
| $MgO$ | 2.3 | 1.6 | 1.2 | 0.9 | 0.4 | — | 3.0 | 3.0 |

| | 73 | 74 | 75 | 76 | 77 | 78 | 79 | 80 |
|---|---|---|---|---|---|---|---|---|
| $SiO_2$ | 76.5% | 76.5% | 76.5% | 76.5% | 80.0% | 80.0% | 80.0% | 80.0% |
| $Al_2O_3$ | 3.0 | 3.5 | 4.0 | 4.5 | 5.0 | 4.0 | 3.0 | 5.0 |
| $Na_2O$ | 17.5 | 17.0 | 16.5 | 16.0 | 15.0 | 16.0 | 17.0 | 13.9 |
| $K_2O$ | — | — | — | — | — | — | — | 1.1 |
| $MgO$ | 3.0 | 3.0 | 3.0 | 3.0 | — | — | — | — |

In carrying out the hydration step utilizing vaporous $H_2O$, the above rods were supported at their ends on refractory or Reflon supports in an electrically heated autoclave so that the rods were suspended horizontally above the base plate thereof. The bottles were supported in three ways: (1) the bottle was inverted on a wood, brass, or stainless steel post coated with Teflon; (2) the bottle was placed upright with its base resting on diatomaceous earth; and (3) where the bottle had a durable rim, it was inverted on a flat stainless steel screen. The autoclave was thereafter heated and steam admitted at a desired pressure, the time required to reach a steady state operation being about 30 minutes with longer times being required at the higher temperatures and pressures. After this treatment, (normally about ¼–16) hours, the heat and steam to the autoclave were stopped and, after allowing the temperature to slowly fall below 100°C. to preclude outgassing or "bloating" of the hydrated portion, the rods or bottles were removed therefrom.

In the commercial practice of the invention, the minimum treating time necessary to secure a completely hydrated article or an article having a hydrated layer of a desired thickness will be determined empirically and this schedule adhered to so long as articles of the same composition and thickness dimensions are being produced. A change in either of these parameters will commonly require a change in treatment schedule. A completely hydrated article can be further exposed to the steam atmosphere without apparent deleterious effect, except for flow or deformation in some instances.

Table II reports times, temperatures, and steam pressures utilized in various hydration treatments of the rod samples along with determinations of the rate of hydration expressed as K values and chemical durability measurements of the initial glass.

The rate of hydration of any glass subjected to treatment in an autoclave is dependent not only upon its chemical composition but also upon the temperature and, hence, the saturated vapor pressure of the systems. At any given temperature, a reaction rate constant K can be defined by the equation $$D = Kt$$

where D is the thickness of the reacted layer in microns and t represents time in hours. In general, $K_2O$-containing glasses tend to exhibit higher reaction rate constants for a given mole fraction of alkali metal oxide than do $Na_2O$-containing glasses. As would be expected, reaction rates of glasses containing both $K_2O$ and $Na_2O$ generally fall between those glasses containing the individual alkali metal oxides alone.

A measure of the chemical durability of the glass was determined by immersing samples in water at 70°C. for a period of 20 hours. The loss of $Na_2O$ and/or $K_2O$ from the original sample was then measured. A loss of less than 100 micrograms/cm² has been deemed to demonstrate satisfactory durability.

TABLE II

| Example No. | Temperature °C. | Time | Pressure | Chemical Durability | K Microns/hour |
|---|---|---|---|---|---|
| 15 | 220 | 16 hours | 250 psig | 15 micrograms/cm² $K_2O$ | 79 |
| 16 | 220 | 16 hours | 250 psig | 7.6 micrograms/cm² $K_2O$<br>4.0 micrograms/cm² $Na_2O$ | 50 |
| 17 | 200 | 16 hours | 225 psig | 8.3 micrograms/cm² $K_2O$ | 13 |
| 18 | 200 | 16 hours | 225 psig | 17.0 micrograms/cm² $Na_2O$ | 125 |
| 19 | 200 | 16 hours | 225 psig | 7.6 micrograms/cm² $K_2O$ | 20 |
| 20 | 120 | 5 hours | 29 psig | Dissolved | 221 |
| 21 | 220 | 16 hours | 250 psig | 4.0 micrograms/cm² $Na_2O$<br>3.8 micrograms/cm² $K_2O$ | 39 |
| 22 | 220 | 16 hours | 250 psig | 6.0 micrograms/cm² $Na_2O$<br>5.0 micrograms/cm² $K_2O$ | 36 |
| 23 | 220 | 16 hours | 250 psig | 7.5 micrograms/cm² $Na_2O$<br>5.4 micrograms/cm² $K_2O$ | 39 |
| 24 | 220 | 16 hours | 250 psig | 9.4 micrograms/cm² $Na_2O$<br>6.4 micrograms/cm² $K_2O$ | 50 |
| 25 | 220 | 16 hours | 250 psig | 5.1 micrograms/cm² $Na_2O$<br>5.0 micrograms/cm² $K_2O$ | 81 |
| 26 | 220 | 16 hours | 250 psig | 9.3 micrograms/cm² $Na_2O$<br>8.2 micrograms/cm² $K_2O$ | 80 |
| 27 | 220 | 16 hours | 250 psig | 7.4 micrograms/cm² $Na_2O$<br>6.4 micrograms/cm² $K_2O$ | — |
| 28 | 220 | 16 hours | 250 psig | 7.8 micrograms/cm² $Na_2O$<br>5.8 micrograms/cm² $K_2O$ | 137 |
| 29 | 220 | 16 hours | 250 psig | 12.1 micrograms/cm² $Na_2O$<br>9.6 micrograms/cm² $K_2O$ | — |
| 30 | 220 | 5 hours | 250 psig | 3.4 micrograms/cm² $Na_2O$<br>1.5 micrograms/cm² $K_2O$ | 22 |

TABLE II—Continued

| Example No. | Temperature °C. | Time | Pressure | Chemical Durability | K Microns/hour |
|---|---|---|---|---|---|
| 31 | 220 | 5 hours | 250 psig | 13.6 micrograms/cm² Na₂O | 83 |
| 32 | 220 | 5 hours | 250 psig | 14.8 micrograms/cm² Na₂O | 82 |
| 33 | 220 | 5 hours | 250 psig | 21.0 micrograms/cm² Na₂O | 86 |
| 34 | 180 | 16 hours | 145 psig | 19.0 micrograms/cm² Na₂O | 44 |
| 35 | 180 | 16 hours | 145 psig | 13.0 micrograms/cm² Na₂O | 45 |
| 36 | 180 | 16 hours | 145 psig | 17.0 micrograms/cm² Na₂O | 59 |
| 37 | 220 | 16 hours | 250 psig | 19.0 micrograms/cm² Na₂O | >136 |
| 38 | 220 | 16 hours | 250 psig | 12.0 micrograms/cm² Na₂O | >163 |
| 39 | 220 | 16 hours | 250 psig | 5.4 micrograms/cm² Na₂O | 85 |
| 40 | 220 | 16 hours | 250 psig | 4.1 micrograms/cm² Na₂O | 89 |
| 41 | 220 | 16 hours | 250 psig | 3.2 micrograms/cm² Na₂O | 84 |
| 42 | 220 | 16 hours | 250 psig | 2.7 micrograms/cm² Na₂O | 64 |
| 43 | 220 | 16 hours | 250 psig | 25.1 micrograms/cm² Na₂O | >160 |
| 44 | 220 | 16 hours | 250 psig | 6.8 micrograms/cm² Na₂O | >135 |
| 45 | 220 | 16 hours | 250 psig | 3.9 micrograms/cm² Na₂O | >156 |
| 46 | 220 | 16 hours | 250 psig | 3.0 micrograms/cm² Na₂O | 57 |
| 47 | 220 | 16 hours | 250 psig | 1.5 micrograms/cm² Na₂O | 73 |
| 48 | 220 | 16 hours | 250 psig | 1.4 micrograms/cm² Na₂O | 37 |
| 49 | 220 | 16 hours | 250 psig | 1.3 micrograms/cm² Na₂O | 42 |
| 50 | 220 | 16 hours | 250 psig | 3.6 micrograms/cm² Na₂O | 65 |
| 51 | 220 | 16 hours | 250 psig | 2.0 micrograms/cm² Na₂O | 50 |

Experience has demonstrated that the hydration process should be continued until a surface layer of at least 0.1 mm. and, preferably, at least 1 mm. in depth is secured. Normally, a time of at least about 15 minutes is required to develop this depth which has been found necessary in order to preclude injury thereto resulting from abrasion concomitant with conventional handling and shipping. Analyses of these layers of the steam-treated articles have manifested a water content therein varying between about 5–35 percent by weight with a proportionate reduction of about 5–35 percent by weight in the amounts of the components present in the original glass.

In making useful containers from a self-degradable glass, at least two critically important features must combine. First, the glass must be resistant to weathering and the material contained therein so long as its use as a container is desired. Second, the glass must begin to degrade upon command, or upon some overt action. Thus, the immediate utility seen for such a glass is in the "one-way" beverage or food container wherein, after the comestibles are removed therefrom, the container is discarded. Hence, for example, in the typical "non-returnable" beverage bottle envisioned in the present invention, two critically important features must be present. First, the glass surface contacting the beverage must be essentially inert thereto and the outside surface of the container ought to be as resistant to weathering as the conditions for use require. Second, after the beverage has been consumed, however, the container should self-degrade or some relatively simple means for causing or initiating the spontaneous degradation or disintegration of the bottle must be present. In other words, because filled beverage bottles may be stored for extended periods of time prior to being used, the commencement of the self-degradation or spontaneous destruction of the bottle should preferably not be left to the whimsy of a naturally occurring reaction. Rather, it ought to be the result of some specific act on the part of the user. For example, the consequent drying of the bottle interior after the beverage has been removed therefrom may initiate self-degradation or a weatherproof plastic or other coating applied on the bottle surface could be removed or abraded to initiate spontaneous disintegration of the container.

One means for securing a bottle demonstrating each of those parameters involves utilizing a high silica glass, i.e., preferably greater than 80 percent by weight $SiO_2$, or one incorporating appropriate additives. Such a glass, as formed, exhibits a chemical durability approaching or even surpassing that of the conventional soda-lime-silica container glass. After being formed into a bottle, the outside surface only is hydrated, making that surface readily subject to degradation. Immediately subsequent to the hydration step, a waterimpermeable coating (normally of an organic plastic or a more durable glass skin produced by chemical treatment of the hydrated layer or by controlled dehydration thereof by means of, for example, exposure to an infra-red radiation lamp wherein the radiation would not penetrate very far into the glass) is applied to the outside hydrated layer to preclude any dehydration or weathering of that layer. To initiate disintegration of the bottle, at least a portion of the impermeable coating is scratched, torn, or otherwise penetrated so that the hydrated layer is exposed to the ambient environment. It is also possible to employ an ultraviolet degradable impermeable coating which, after exposure for a period of time to ambient sunlight or other source of ultraviolet radiation, will crack and no longer be a barrier to the surrounding atmosphere. Subsequent dehydration sets up tensile stresses in the surface layer. These tensile stresses cause fine cracks to occur which propagate from the hydrous surface layer into the core portion of the bottle wall resulting in the bottle being finally reduced to a fine powder.

We have found that the presence of $Al_2O_3$ in the glass composition improves this crack propagation. Also, the stress patterns can be tailored by varying the surface layer to core thickness ratio. Finally, a low $H_2O$ content in the hydrated layer optimizes the interface bond strength between the hydrated layer and the core.

A modification of this method can include first treating the inside wall of the bottle to inhibit subsequent hydration and, where necessary, improve the chemical durability thereof. Thereafter, the entire bottle is exposed to the hydration process but the reactions can occur only through the outer wall surface and then only up to the durable inner surface layer. Subsequent to the hydration step, the impermeable coating described in the preceding paragraph is applied to the outer wall of the bottle. This embodiment of the invention permits greater flexibility of glass composition and simplifies the hydration step since no protection of the inner wall of the bottle during the hydration step is required. Hence, a very readily degradable hydrated glass can be utilized such that, after the external impermeable coating has been damaged, the bottle will disintegrate very rapidly.

Several methods for fortifying the glass surface against hydration or chemical attack have been found applicable. For example, the surface can be contacted with vapors containing $SO_3$, $CuCl$, and/or $F^-$ at temperatures in the annealing range of the glass. Also, an exchange of alkali metal ions with $Li^+$ and/or $Cu^+$ ions, accomplished through the contact of the glass with a molten $Li^+$ and/or $Cu^+$ salt at temperatures in the annealing range and up to the deformation or softening point of the glass, has proven to be applicable. Finally, a combination of these two practices has also been shown to be effective. Table III is illustrative of this practice.

container is maintained therein for a sufficient length of time to make the top and outside rim area as chemically durable as the inside surface thereof.

Another modification of the hydration step can involve filling the bottle with a hydration-preventing liquid and then placing the bottle in the hydrating environment. In this manner only the outside surface will react therewith. Such a liquid would include concentrated aqueous solutions of lithium or chromium salts, concentrated aqueous solutions of acidic salts, or concentrated aqueous solutions of acids. Table IV records several examples of the effectiveness of this practice.

TABLE IV

| Example No. | Solution | Hydration Step | | |
|---|---|---|---|---|
| | Grams of Salt in 100 ml. $H_2O$ | Temperature °C. | Time | Observations |
| 7 | 2 grams LiCl | 160 | 16 hours | clear sample |
| 7 | 100 grams LiCl | 170 | 16 hours | clear, no hydration |
| 7 | 37.5 grams $KHSO_4$ | 200 | 16 hours | clear, no noticeable hydration |
| 7 | >5 grams $KHSO_4$ | 200 | 16 hours | clear, no hydration |
| 13 | 62.5 grams $NaHSO_4$ | 200 | 16 hours | clear |
| 14 | 100 grams $CaCl_2$ | 170 | 16 hours | clear |

Whereas the above working embodiments of the invention have contemplated hydrating glass in an atmosphere of steam alone, it is possible to secure the desired hydration, while concurrently achieving a chemically durable surface skin, by including a vapor phase with the steam that will not deleteriously affect the hy-

TABLE III

| Example No. | Treatment | Weight Loss (micrograms/cm²) after 20 Hours in Water at 70°C. | |
|---|---|---|---|
| | | Before Hydration | After Hydration |
| 1 | $SO_3$ vapor for 1 hour at 550°C. | <0.1 $Na_2O$ | 250 $Na_2O$ |
| 1 | Fluorine for 1 hour at 600°C. | <0.1 $Na_2O$ | 250 $Na_2O$ |
| 1 | CuCl + CuS salt for 16 hours at 570°C. | <0.07 $K_2O$, <0.07 CuO | — |
| 1 | $Li_2SO_4$ salt for 1 hour at 500°C. | <0.6 $Na_2O$ | 90 $Na_2O$ |
| 2 | $SO_3$ vapor for 1 hour at 550°C. | 0.02 $K_2O$ | 170 $K_2O$ |
| 3 | CuCl vapor for 20 hours at 530°C. | 20 $K_2O$, <0.06 CuO | 13,000 $K_2O$ |
| 4 | $H_2SO_4$ vapor for 1/4 hour at 500°C. | <10 $K_2O$ | 850 $K_2O$ |
| 5 | $SO_3$ vapor for 10 minutes at 525°C. | <0.07 $K_2O$ | — |
| 5 | $Li_2SO_4$ salt for 1 1/4 hours at 550°C. | <0.7 $K_2O$, <0.01 $Li_2O$ | — |
| 6 | $H_2SO_4$ for 2 hours at 270°C. | 8 $K_2O$, 0.4 $Li_2O$ | — |
| 7 | $SO_3$ vapor for 1 hour at 550°C. | 0.06 $K_2O$ | 90 $K_2O$ |
| 7 | CuCl salt for 18 hours at 550°C. | 0.13 $K_2O$, <0.1 CuO | — |
| 8 | $SO_3$ vapor for 2 hours at 550°C. | 0.03 $Na_2O$ | 75 $Na_2O$ |
| 9 | $Li_2SO_4$ salt for 4 hours at 580°C. | <0.6 $K_2O$, <0.1 $Li_2O$ | 1.9 $K_2O$, <0.1 $Li_2O$ |
| 10 | $Li_2SO_4$ salt for 4 hours at 570°C. | <6 $K_2O$, <0.2 $Li_2O$ | <6 $K_2O$, <0.2 $Li_2O$ |
| 11 | $Li_2SO_4$ salt for 1 hour at 580°C. | <0.06 $K_2O$, <0.01 $Li_2O$ | — |
| 12 | $Li_2SO_4$ salt for 1 1/4 hours at 550°C. | <0.01 $K_2O$, <0.03 $Li_2O$ | — |
| 64 | $Li_2SO_4$ salt for 1 hour at 530°C. | 0.4 $Na_2O$, <0.1 $K_2O$, <0.2 $Li_2O$ | 0.2 $Na_2O$, 0.1 $K_2O$, 0.3 $Li_2O$ |

Not only is it necessary to provide a chemically durable inner surface for beverage containers, but at least a portion of the outside of the rim and the top thereof must also be durable to permit drinking and pouring of the beverage. The steam hydration process of the invention frequently causes an increase in the dimensions of the container leading to capping problems. The application of a more chemically durable material over the hydrated glass is rendered quite difficult when the dividing line between the inner durable surface and the outer, hydrated glass is on the inside of the rim.

To alleviate this situation, a second step can be added to the above-described ion exchange reaction wherein, after the interior surface of the container has been made durable, the molten salt is removed therefrom and the container inverted in a shallow vessel filled with the ion exchanging salt to the desired depth. The dration mechanism but which will fortify the glass surface against chemical attack. An environment containing acetic acid vapors has been discovered to be especially effective. Low concentrations of vapors of such mineral acids as $H_3PO_4$ and $H_2SO_4$ have also been found useful. The simplest manner of providing these vapors is through the use of the acids, themselves, although hydrolysis of their salts has also been demonstrated to be feasible.

Table V sets forth several examples of such treatments and comparisons are reported between glasses autoclaved in a steam atmosphere alone and glasses of the same composition treated in steam together with acetic acid vapor. In the latter process, the glasses were autoclaved in the vapor over an aqueous solution of acetic acid, the concentrations thereof being in weight percent.

TABLE V

| Example No. | Atmosphere | Autoclave Temperature | Autoclave Time | Autoclave Pressure | Chemical Durability 20 hours-70°C.-$H_2O$ |
|---|---|---|---|---|---|
| 74 | Steam | 250°C. | 24 hours | 550 psig | 6000 micrograms $Na_2O/cm^2$ |
| 74 | Steam + 10% Acetic Acid Vapor | 220°C. | 6 hours | 250 psig | 100 micrograms $Na_2O/cm^2$ |
| 74 | Steam + 20% $H_3PO_4$ Acid Vapor | 250°C. | 16 hours | 550 psig | 11.3 micrograms $Na_2O/cm^2$ |
| 75 | Steam | 250°C. | 24 hours | 550 psig | 5000 micrograms $Na_2O/cm^2$ |
| 75 | Steam + 10% Acetic Acid Vapor | 220°C. | 6 hours | 250 psig | 50 micrograms $Na_2O/cm^2$ |

Although hydration is commonly undertaken through steam treatment, hydration in various aqueous solutions is also feasible. Two competitive reactions take place when the glass is autoclaved in aqueous solutions. The first comprises the desired hydration whereas the second involves leaching and dealkalization of the surface layer. Nevertheless, when the leaching is properly controlled, it can prove beneficial in three ways: (1) by providing a more durable surface; (2) by giving a porous surface that can be impregnated with plastic or silicone; and (3) by forming a surface compression layer which is lower in alkali and water contents. Therefore, the use of an aqueous solution as the hydrating medium can lead to the production of a more durable skin on the hydrated layer and better control of the $H_2O$ gradient into the glass surface. The only precaution that ought to be observed in the undertaking of this embodiment of the invention is to avoid bringing the aqueous solution to the boiling point. Two broad methods for carrying out this mode of hydration are set forth immediately below.

In the first, the bottle is immersed into a single liquid such that both the inside and outside surfaces are contacted therewith. A weather-resistant, impermeable surface coating such as a plastic or silicone may then be applied to the outside surface of the bottle or a thin surface layer can be dehydrated to produce an impermeable skin by, for example, freeze drying, contacting with acid, or even careful heating in a dry atmosphere. Although water alone may be employed, (at higher $SiO_2$ contents where dissolution of the glass surface will not occur) it is much to be preferred that the liquid be capable of producing a fairly durable skin on the hydrated layer. The phenomenon is normally accomplished through an ion exchange reaction. Hence, aqueous solutions of neutral salts containing $Li^+$, $Na^+$, and/or $K^+$ ions have been found satisfactory as have aqueous solutions of acidic salts containing $Ca^{+2}$, $Mg^{+2}$, $Al^{+3}$, $B^{+3}$, and/or $P^{+5}$. This required hydration plus surface fortification has also been secured with dilute solutions of weak or strong acids and with aqueous solutions of silicones and plastics. Thus, for example, autoclaving in aqueous solutions of $NaHSO_4$, $Na_2SO_4$, $Li_2SO_4$, $K_2SO_4$, $KHSO_4$, and $KNO_3$ of moderate concentrations has shown that the concentration of $H_2O$ in the hydrated glass can be controlled. In explanation therefor, it can be said that the solutions or hydration of the ions in the solution decreases the concentration of free $H_2O$ molecules at the glass surface so that the equilibrium concentration of water in the hydrated glass is lower than it would be in the presence of water alone. In addition, an exchange of cations for those in the hydrated layer, e.g., $Li^+$ or $H^+$ for $Na^+$ or $K^+$, will increase the chemical durability of the hydrated layer as measured in $H_2O$ for 20 hours at 70°C. Table VI illustrates this practice.

TABLE VI

| Example No. | Solution Grams of Salt in 100 ml. $H_2O$ | Autoclave Temperature °C. | Autoclave Time | % $H_2O$ in Layer | Chemical Durability 20 hours-70°C.-$H_2O$ (Micrograms/cm²) |
|---|---|---|---|---|---|
| 7 | 50 grams KI | 160 | 16 hours | 14.1 | |
| 7 | 100 grams KI | 160 | 16 hours | 12.5 | |
| 7 | 127 grams KI | 160 | 16 hours | 12.0 | |
| 7 | 1 gram LiCl | 160 | 16 hours | 11.0 | |
| 7 | 2 grams LiCl | 160 | 16 hours | 7.8 | |
| 7 | 100 grams LiCl | 170 | 16 hours | 0 | 1.3 $K_2O$, <0.3 $Li_2O$ |
| 7 | 50 grams KI | 200 | 16 hours | 12.8 | |
| 7 | 100 grams KI | 200 | 16 hours | 8.4 | |
| 7 | 150 grams KI | 200 | 16 hours | 7.5 | |
| 7 | 200 grams KI | 200 | 16 hours | 6.6 | |
| 7 | 25 grams $Cr_2O_3 \cdot 9H_2O$ | 200 | 16 hours | 9.2 | |
| 7 | 50 grams $Cr(NO_3)_3 \cdot 9H_2O$ | 200 | 16 hours | 9.3 | |
| 7 | 2 1/2 ml. Quinlon* C (chromium stearate complex) | 200 | 16 hours | 10.2 | |
| 7 | 12.5 grams $KHSO_4$ | 200 | 16 hours | 11.1 | |
| 7 | 25 grams $KHSO_4$ | 200 | 16 hours | 10.8 | |
| 7 | 62.5 grams $KHSO_4$ | 200 | 16 hours | <0.1 | |
| 7 | 170 grams $KHSO_4$ | 200 | 16 hours | <0.1 | |
| 7 | None | 200 | 16 hours | 30 | |
| 7 | 40 grams NaCl | 170 | 16 hours | 6.6 | |
| 74 | 80 grams $NaH_2PO_4$ | 250 | 29 hours | 8 | 6.8 $Na_2O$ |

Lithium salts drastically decrease the rate of hydration and the total amount of hydration. Concentrations greater than about 20 percent by weight appear to completely inhibit hydration. Concentrated solutions of calcium and magnesium salts also prevent hydration. Excessively dilute solutions will frequently leave hydroxide precipitates in and on the glass article.

Autoclaving in dilute (1-5 percent by weight) solutions of sulphuric or phosphoric acids has resulted in hydrated surface layers exhibiting some compressive stress therein and fair-to-good chemical durability.

Where desired, a surfactant such as chromium stearate can be included in the contacting solution as well as a bonding agent suitable for bonding an impermeable plastic or silicone coating to the glass surface.

The second method for carrying out the hydration process utilizing a liquid medium contemplates contacting the inside surface of the bottle with a hydration-inhibiting liquid before or while the outside surface is being exposed to a hydration-promoting fluid. Hence, for example, the liquid in the inside of the bottle might comprise a concentrated solution of lithium or chromium salts, a concentration solution of acidic salts, or a concentrated solution of acids. In contrast to that, the liquid contacting the outside surface is a hydration-promoting agent such as water itself or one of the solutions recited above in the description of the first method for hydrating the glass in a liquid medium. Table VII is illustrative of this practice. A weatherresistant impermeable coating of, for example, a plastic or silicone is thereafter applied to the outer surface of the bottle.

are relatively insoluble and degrade by progressive cracking as they dehydrate. Thus, the addition of alkalinity to the surroundings is minimized. Of course, if the alkali oxide of the glass is $K_2O$, slight leaching thereof would be beneficial as a soil fertilizer.

The small additions of MgO, $Al_2O_3$, $B_2O_3$, and/or CaO substantially decrease the capability of the binary potassium silicate glasses to be steam-treated but do improve the overall durability thereof. The addition of more than 1.5% CaO leads to the production of a milky-colored or opaque second phase containing cristobalite and calcium silicate crystals.

The rate of the steam hydration reaction for a given glass is dependent upon four factors: time, temperature, relative humidity, and steam pressure. Hence,

TABLE VII

| Example No. | Aqueous Solution | | Autoclave | | Observations |
|---|---|---|---|---|---|
| | Inside Surface | Outside Surface | Temperature °C | Time | |
| 11 | 43% LiCl | Dilute HCl | 200 | 16 hours | No hydration inside 0.016" hydration outside |
| 11 | 43% LiCl | 5% Cr(No$_3$)$_3$·9H$_2$O | 200 | 16 hours | No hydration inside 0.025" hydration outside |
| 7 | 43% LiCl | 2% EDTA | 180 | 16 hours | No hydration inside 0.032" hydration outside |
| 7 | 43% LiCl | 10% water glass | 180 | 16 hours | No hydration inside 0.085" hydration outside |
| 8 | 43% LiCl | 50% KI | 160 | 16 hours | No hydration inside 0.050" hydration outside |
| 13 | 43% LiCl | 25% NaHSO$_4$ | 160 | 16 hours | No hydration inside 0.032" hydration outside |

The practice of hydrating the glass articles in aqueous solutions can only be undertaken in those articles of good chemical durability. Otherwise, as was explained in U.S. Pat. No. 3,498,803, the hydrated layer can be dissolved therein.

The chemical durability of the steam hydrated surface glass can be enhanced through an ion exchange reaction undertaken in the concentrated solutions of salts and/or acids referred to above as hydration-inhibiting solutions. Contact with formamide will likewise improve the chemical durability of the hydrated surface. These treatments ought to be carried out at elevated temperatures below the boiling point of the particular solution. Table VIII points out the efficacy of this practice.

where the $SiO_2$ content of the binary glass does not exceed about 80 percent by weight, temperatures up to 120°C. and steam pressures no higher than about 18 psig will bring about a desired amount of surface hydration within a reasonable length of time, i.e., less than about 24 hours. However, at greater $SiO_2$ or $SiO_2$ + MO concentrations, higher temperatures and steam pressures will be required to secure a similar rate of hydration. Thus, temperatures approaching and even exceeding 300°C. and steam pressures of 1,245 psig and greater can be demanded for hydration. Obviously, such higher temperatures and pressures will greatly expedite the hydration of the lower $SiO_2$ content glass.

The following records the production techniques utilized in making bottles from the glass of Example 20,

TABLE VIII

| Example No. | Autoclave—Steam | | | Time at 90°C. | Chemical Durability 20 hours-70°C.-H$_2$O (micrograms/cm$^2$) |
|---|---|---|---|---|---|
| | Temperature | Time | Aqueous Solution | | |
| 67 | 220°C. | 6 hours | None | None | 6000 Na$_2$O, 2000 K$_2$O |
| 67 | 220°C. | 6 hours | 5% SnCl$_4$ | 4 hours | 98 Na$_2$O, 30 K$_2$O |
| 67 | 220°C. | 6 hours | 10% SnCl$_4$ | 4 hours | 88 Na$_2$O, 24 K$_2$O |

As has been explained above, from an ecological point of view, the preferred self-degrading mechanism would involve microcracking only, i.e., there would be essentially no dissolution or leaching of the glass. As such, the glass would disintegrate solely into very fine particles or "grains of sand" which would be harmless to the soil and the environment. This ideal can be closely approached in silicate glasses falling generally within the area ABGA of the appended ternary composition diagram. These glasses, after steam hydration, a composition falling within area BCDB of the appended drawings, i.e., a composition wherein the degradation of the glass occurs principally through chemical solution.

A batch of sand and anhydrous potassium carbonate was formulated to yield 200 lbs. of a glass having an oxide composition, in weight percent, of 74 percent $SiO_2$ and 26% $K_2O$. These two ingredients were thoroughly blended together and then run into a platinum crucible. The crucible was positioned within an electrically-fired melting unit and heated for 16 hours at 1,450°C., the melt being stirred to insure homogeneity. The heat was then cut back to a working temperature of about 1,250°C. and about 200 bottles having a 12-oz. capacity with a 42 mm. O.D. mouth were hand blown. The moille was cut off with a gas-oxygen flame and the bottle placed in an annealer operating at 500°C.

The bottles were thereafter filled to within about one-half inch of the mouth rim with a molten salt comprised, in mole percent, of 25% $Li_2SO_4$, 45% $ZnSO_4$, and 30% $K_2SO_4$. The salt was contained within the bottles for one hour at 525°C. The bottles were then emptied and upended in a bath of the same molten salt combination having sufficient depth to cover the rim portion thereof. This rim portion was also treated in the solution for about 1 hour at 525°C. Subsequently, the bottles were cooled to room temperature and the salt removed therefrom with tap water.

The bottles were then treated in saturated steam at 1 atmosphere pressure for 16 hours at 95°–100°C. in two groups. In the first group, a rubber cap with a small slit in the middle for equalizing the interior and outer pressures was slipped over the mouth of each bottle. In the second group, the bottles were inverted on wooden posts with the rims immersed in a silicone oil. These precautions were taken even though the interior of the bottle had been previously fortified through the salt treatment to insure against reaction with the steam since the base glass composition, itself, is relatively water soluble. The bottles were removed from the steam treating chamber and a piece of glass fiber tape, 3 inches × ½ inch, was vertically aligned along the outside of the bottle extending up to the rim portion thereof. A coating of 20 percent by weight SARAN$^R$ in butyl acetate was applied to the entire outside surface of the bottle exclusive of the rim portion such that one end of the glass fiber tape extended somewhat beyond the SARAN$^R$ coating.

The bottles were then filled with COCA COLA$^R$ and capped will pull tab type aluminum caps. After two months wherein both groups of bottles remained intact, the caps were removed, the COKE$^R$ poured out therefrom and ingested, and the fiber glass tape pulled away, thereby removing a portion of the SARAN$^R$ coating and exposing the bottle surface to the indoor ambient atmosphere. Within 2 months, significant degradation of the bottles was apparent.

The following material sets out the production techniques employed in making bottles from the glass of Example 64, a composition falling within area BDEFGB of the appended drawing, i.e., a composition wherein the degradation of the glass takes place through a combination of physical disintegration and chemical solution.

A batch sufficient to yield 200 pounds of a glass having an oxide composition, in weight percent, of 76.5% $SiO_2$, 20% $Na_2O$, 3% MgO, and 0.5% $Al_2O_3$ was formulated from sand, sodium carbonate, sodium nitrate, aluminum, and magnesium oxide. These ingredients were carefully blended together and then run into a platinum crucible. The crucible was placed within an electrically-fired melting unit and heated for 16 hours at 1,450°C., the melt being stirred to insure homogeneity. The heat was then cut back to a working temperature of about 1,205°C. and about 200 bottles having a 12-oz. capacity with a 42 mm. O.D. mouth were hand blown. The moille was cut off with a gas-oxygen flame and the bottles transferred to an annealer operating at 500°C.

The bottles were thereafter filled to within about one-half inch of the mouth rim with a molten salt composed, in mole percent, of 25% $Li_2SO_4$, 45% $ZnSO_4$, and 30% $K_2SO_4$. The salt was maintained within the bottles for one hour at 525°C. The bottles were then emptied and upended in a bath of the same molten salt combination having sufficient depth to cover the rim portion thereof. This rim portion was also exposed to the salt medium for 1 hour at 525°C. Subsequently, the bottles were cooled to room temperature and the salt adhered thereto removed with tap water.

Therafter, the bottles were divided into two groups. In the first group, the bottles were inverted with the rims immersed in a silicone oil to provide protection for the interior of the bottle during the subsequent hydration step. In the second group, the bottles were merely inverted on Teflon$^R$ coated glass posts. Both groups were thereafter transferred to an autoclave and treated in saturated steam for 24 hours at 160°C. at a pressure of about 100 psig. The bottles were removed from the autoclave, transferred to a wet box, and a piece of glass fiber tape, 3 inches × ½ inch, was vertically aligned along the outside of each bottle extending up to the rim portion thereof. A coating of 20 percent by weight SARAN$^R$ in butyl acetate was applied to the entire outside surface of the bottle exclusive of the rim portion such that one end of the tape extended somewhat beyond the SARAN$^R$ coating.

The bottles were then filled with COCA COLA$^R$ and sealed with aluminum caps of the pull tab type. When no signs of wear or attack were observed on the bottles of either group after six weeks, the caps were lifted off, the liquid poured out, and the fiber glass tape pulled away, thus removing a portion of the SARAN$^R$ coating to expose the bottle surface in that area to the indoor ambient atmosphere. Significant degradation of the bottles was present after about 6 months.

We claim:

1. A method for making a glass article having at least a surface portion which is resistant to weathering but that will, when said weathering-resistant portion is destroyed, self-degrade in the ambient atmosphere which comprises:

a. treating a glass having a composition within the area ABCDEFGA of the ternary composition diagram to a $H_2O$-containing environment composed of at least 50 percent by weight $H_2O$ at a temperature of at least 50°C. for a period of time sufficient to develop at least a surface portion within said glass having about 5–35 percent by weight $H_2O$ within its volume; and b. simultaneously therewith or subsequently thereto securing a weathering-resistant skin layer to said surface portion which, when the integrity thereof is destroyed, exposes said treated portion to the ambient atmosphere whereby said treated portion will self-degrade through means selected from the group consisting of physical disintegration and chemical solution.

2. A method according to claim 1 wherein said $H_2O$-containing environment is at a pressure of at least one atmosphere.

3. A method according to claim 1 wherein said $H_2O$-containing environment is a gaseous environment.

4. A method according to claim 1 wherein said temperature ranges between about 50°–300°C.

5. A method according to claim 2 wherein said pressure ranges up to about 1,245 psig.

6. A method according to claim 1 wherein said time is at least about 15 minutes.

7. A method according to claim 6 wherein said time ranges between about ¼–24 hours.

8. A method according to claim 1 wherein said weathering-resistant skin layer is secured by applying an organic plastic coating to said outside surface after said article has been exposed to a $H_2O$-containing environment.

9. A method according to claim 3 wherein said weathering-resistant skin layer is secured by including acidic vapors in said $H_2O$-containing environment.

10. A method according to claim 9 wherein said acidic vapors are of acetic acid.

11. A method according to claim 1 wherein said weathering-resistant skin layer is secured through the controlled dehydration of said surface portion.

12. A method according to claim 1 wherein said glass article has a composition falling within the area ABGA of the ternary composition diagram and will self-degrade in the ambient atmosphere essentially through physical disintegration alone.

13. A method according to claim 1 wherein said glass article has a composition falling within the area BCDB of the ternary composition diagram and will self-degrade in the ambient atmosphere essentially through chemical solution alone.

14. A method according to claim 1 wherein said glass article has a composition falling within the area BDEFGB of the ternary composition diagram and will self-degrade in the ambient atmosphere through a combination of physical disintegration and chemical solution.

15. A method for making a glass container that is resistant to weathering and the material contained therewithin but which will, when said resistance to weathering and the material contained therewithin is destroyed, self-degrade in the ambient atmosphere which comprises:
  a. forming said container from a glass having a composition falling within the area ABCDEFGA of the ternary composition diagram;
  b. treating the article wall only of said container to a $H_2O$-containing environment composed of at least 50 percent by weight $H_2O$ at a temperature of at least 50°C. for a period of time sufficient to develop at least a surface portion within said wall having about 5–35 percent by weight of $H_2O$ within its volume; and then
  c. securing a weathering-resistant skin layer to said outside surface of the container which, when the integrity thereof is destroyed, exposes said treated portion to the ambient atmosphere whereby said treated portion will self-degrade through means selected from the group consisting of physical disintegration and chemical solution.

16. A method according to claim 15 wherein said $H_2O$-containing environment is at a pressure of at least one atmosphere.

17. A method according to claim 15 wherein said $H_2O$-containing environment is a gaseous environment.

18. A method according to claim 15 wherein said temperature ranges between about 50°–300°C.

19. A method according to claim 16 wherein said pressure ranges up to about 1,245 psig.

20. A method according to claim 15 wherein said time is at least about 15 minutes.

21. A method according to claim 20 wherein said time ranges between about ¼–24 hours.

22. A method according to claim 15 wherein said weathering-resistant skin layer is secured by applying an organic plastic coating to said outside surface after said container has been exposed to a $H_2O$-containing environment.

23. A method according to claim 15 wherein said weathering-resistant skin layer is secured to including acidic vapors in said $H_2O$-containing environment.

24. A method according to claim 23 wherein said acidic vapors are of acetic acid.

25. A method according to claim 15 wherein said weathering-resistant skin layer is secured through the controlled dehydration of said surface portion.

26. A method according to claim 15 wherein said weathering-resistant skin layer is secured through an ion exchange reaction brought about by contacting the surface of said container with formamide or with concentrated aqueous solutions of salts and/or acids.

27. A method according to claim 15 wherein said container is formed from a glass having a composition falling within the area BCDB of the ternary composition diagram and wherein the inside wall of said container is treated to improve the chemical durability thereof.

28. A method for making a glass container that is resistant to weathering and the material contained therewithin but which will, when said resistance to weathering and the material contained therewithin is destroyed, self-degrade in the ambient atmosphere which comprises:
  a. forming said container from a glass having a composition falling within the area ABCDEFGA of the ternary composition diagram;
  b. treating the inside wall of said container to inhibit hydration and, optionally, to improve the chemical durability thereof;
  c. subjecting said container to a $H_2O$-containing environment composed of at least 50 percent by weight $H_2O$ at a temperature of at least 50°C. for a period of time sufficient to develop at least a surface portion within said outside wall having about 5–35 percent by weight $H_2O$ within its volume; and then
  d. securing a weathering-resistant skin layer to said outside wall of said container which, when the integrity thereof is destroyed, exposes said treated portion of the outside wall to the ambient atmosphere whereby said treated portion will self-degrade through means selected from the group consisting of physical disintegration and chemical solution.

29. A method according to claim 28 wherein said $H_2O$-containing environment is at a pressure of at least one atmosphere.

30. A method according to claim 28 wherein said $H_2O$-containing environment is a gaseous environment.

31. A method according to claim 28 wherein said temperature ranges between about 50°–300°C.

32. A method according to claim 29 wherein said pressure ranges up to about 1245 psig.

33. A method according to claim 28 wherein said time is at least about 15 minutes.

34. A method according to claim 33 wherein said time ranges between about ¼–24 hours.

35. A method according to claim 28 wherein said weathering-resistant skin layer is secured by applying an organic plastic coating to said outside surface after said container has been exposed to a $H_2O$-containing environment.

36. A method according to claim 28 wherein said weathering-resistant skin layer is secured by including acidic vapors in said $H_2O$-containing environment.

37. A method according to claim 36 wherein said acidic vapors are of acetic acid.

38. A method according to claim 28 wherein said weathering-resistant skin layer is secured through the controlled dehydration of said surface portion.

39. A method according to claim 28 wherein said weathering-resistant skin layer is secured through an ion-exchange reaction brought about by contacting the surface of said container with formamide or with concentrated aqueous solutions of salts and/or acids.

40. A method according to claim 28 wherein said inside wall is treated by contacting with vapors of $SO_3$, CuCl, and/or $F^-$ at temperatures in or above the annealing range of said glass.

41. A method according to claim 28 wherein said inside wall is treated by contacting with a molten salt of $Li^+$ and/or $Cu^+$ ions at temperatures in or above the annealing range of said glass.

42. A method according to claim 28 wherein the inside wall is treated by filling said container with a hydration-preventing liquid, this liquid being retained therein during the subsequent exposure of said container to said $H_2O$-containing environment.

43. A method according to claim 42 wherein said hydration-preventing liquid is selected from the group consisting of concentrated aqueous solutions of lithium and/or chromium salts, concentrated aqueous solutions of acidic salts, and concentrated aqueous solutions of strong acids.

44. A method for making a glass container that is resistant to weathering and the material contained therewithin but which will, when said resistance to weathering and the material contained therewithin is destroyed, self-degrade in the ambient atmosphere which comprises:
   a. forming said container from a glass having a composition falling within the area ABCDEFGA of the ternary composition diagram;
   b. immersing said container into a hydration-promoting liquid at a temperature of at least 50°C. but below the boiling point of said liquid for a period of time sufficient to develop at least a surface portion within at least the outside wall thereof having about 5–35 percent by weight $H_2O$ within its volume; and
   c. securing a weathering-resistant surface layer to said outside wall of the container which, when the integrity thereof is destroyed, exposes said immersed portion to the ambient atmosphere whereby said immersed portion will self-degrade through means selected from the group consisting of physical disintegration and chemical solution.

45. A method according to claim 44 wherein said hydration-promoting liquid contacts both the inside and the outside walls of said container.

46. A method according to claim 44 wherein said hydration-promoting liquid is selected from the group consisting of dilute aqueous solutions of neutral salts of lithium, sodium, and/or potassium, dilute aqueous solutions of acidic salts of aluminum, boron, calcium, magnesium, and/or phosphorous, and dilute aqueous solutions of weak and strong acids.

47. A method according to claim 44 wherein a hydration-preventing liquid is placed in the container prior to said container being immersed into said hydration-promoting liquid.

48. A method according to claim 47 wherein said hydration-preventing liquid is selected from the group consisting of concentrated aqueous solutions of lithium and/or chromium salts, concentrated aqueous solutions of acidic salts, and concentrated aqueous solutions of strong acids.

49. A method according to claim 44 wherein the inside wall of said container is treated to inhibit hydration and, where necessary, to improve the chemical durability thereof.

50. A method according to claim 49 wherein said inside wall is treated by contacting with vapors of $SO_3$, CuCl, and/or $F^-$ at temperatures in or above the annealing range of said glass.

51. A method according to claim 49 wherein said inside wall is treated by contacting with a molten salt of $Li^+$ and/or $Cu^+$ ions at temperatures in or above the annealing range of said glass.

52. A method according to claim 44 wherein said weathering-resistant skin layer is secured by applying an organic plastic coating to said outside surface after said container has been exposed to a $H_2O$-containing environment.

53. A method according to claim 44 wherein said weathering-resistant skin layer is secured by including acidic vapors in said $H_2O$-containing environment.

54. A method according to claim 53 wherein said acidic vapors are of acetic acid.

55. A method according to claim 44 wherein said weathering-resistant skin layer is secured through the controlled dehydration of said surface portion.

56. A method according to claim 44 wherein said weathering-resistant skin layer is secured through an ion exchange reaction brought about by contacting the surface of said container with formamide or with concentrated aqueous solutions of salts and/or acids.

* * * * *